United States Patent
Shahan et al.

(10) Patent No.: US 11,473,647 B1
(45) Date of Patent: Oct. 18, 2022

(54) ISOLATION SYSTEM AND METHOD

(71) Applicant: HRL LABORATORIES LLC, Malibu, CA (US)

(72) Inventors: David W. Shahan, Los Angeles, CA (US); Geoffrey P. McKnight, Los Angeles, CA (US); Sloan P. Smith, Calabasas, CA (US); Christopher B. Henry, Thousand Oaks, CA (US); Christopher B. Churchill, Ventura, CA (US); Andrew C. Keefe, Encino, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 14/839,770

(22) Filed: Aug. 28, 2015

Related U.S. Application Data

(60) Provisional application No. 62/043,369, filed on Aug. 28, 2014.

(51) Int. Cl.
  *F16F 15/04* (2006.01)
(52) U.S. Cl.
  CPC ........ *F16F 15/04* (2013.01); *F16F 2228/063* (2013.01)
(58) Field of Classification Search
  USPC ....... 248/560, 562, 566, 580, 581, 589, 610, 248/613
  See application file for complete search history.

(56) References Cited

U.S. PATENT DOCUMENTS

| | | | |
|---|---|---|---|
| 5,833,204 A * | 11/1998 | Platus ..................... | F16F 3/026 248/619 |
| 6,874,603 B2 | 4/2005 | Lisenker et al. | |
| 8,132,773 B1 | 3/2012 | Platus | |
| 8,240,439 B2 | 8/2012 | Nakajima et al. | |
| 8,439,299 B2 | 5/2013 | Luo et al. | |
| 2012/0305698 A1* | 12/2012 | Schank ................. | B64C 27/615 244/17.11 |
| 2014/0048240 A1* | 2/2014 | Platus ..................... | B64G 1/50 165/185 |
| 2014/0048989 A1* | 2/2014 | Platus ..................... | F16F 15/04 267/140.5 |
| 2015/0014510 A1* | 1/2015 | Dunning ............... | F16F 15/073 248/618 |
| 2015/0204413 A1* | 7/2015 | Churchill .............. | F16F 15/022 248/550 |

OTHER PUBLICATIONS

Rivin, "Handbook on Stiffness & Damping in Mechanical Design," ASME, Table of Contents, Introduction and Definitions, Nonlinear and Variable Stiffness Systems Preloading, Use of "Managed Stiffness" in Design, 23 pages, 2010.

* cited by examiner

*Primary Examiner* — Alfred J Wujciak
(74) *Attorney, Agent, or Firm* — Lewis Roca Rothgerger Christie LLP

(57) ABSTRACT

An isolation system and method are disclosed. The isolation system includes a beam that includes a first end and a second end. The isolation system may include at least one clamping block comprising first elastomeric material, and the first end may be coupled with the first elastomeric material by the at least one clamping block. An end condition of the buckling beam may be varied based on compression stiffening of the first elastomeric material.

13 Claims, 10 Drawing Sheets

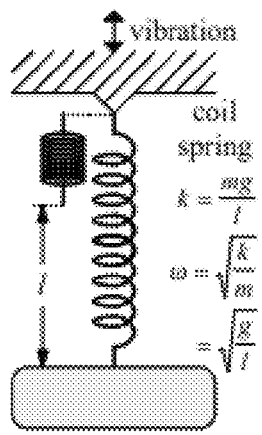
FIG. 1a
Prior Art
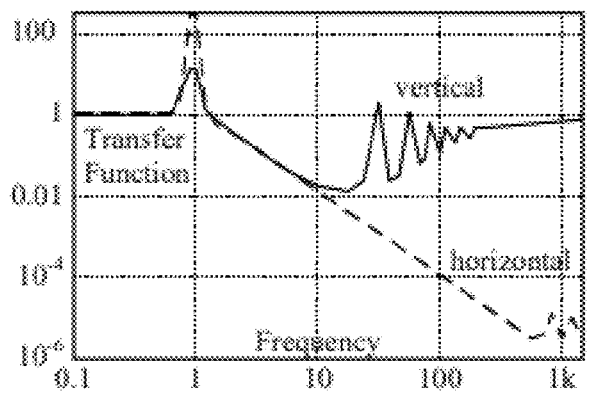
FIG. 1b
Prior Art
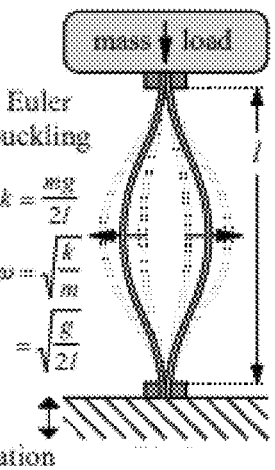
FIG. 1c
Prior Art
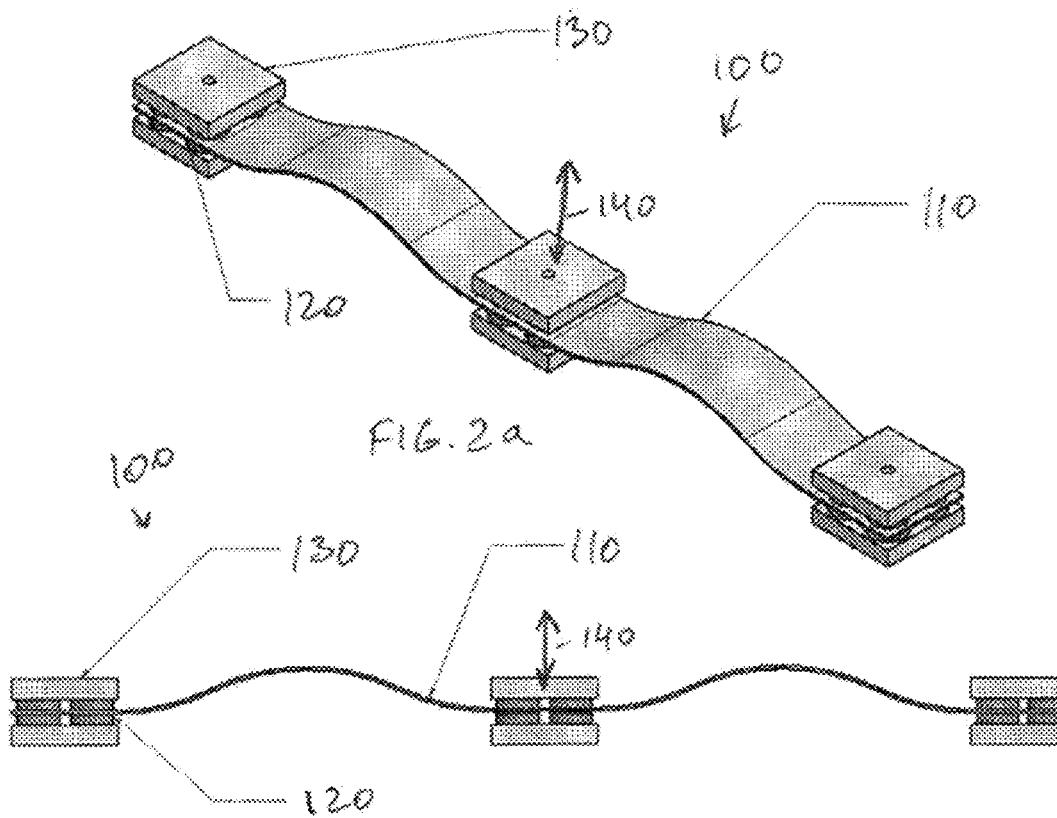
FIG. 2a
FIG. 2b

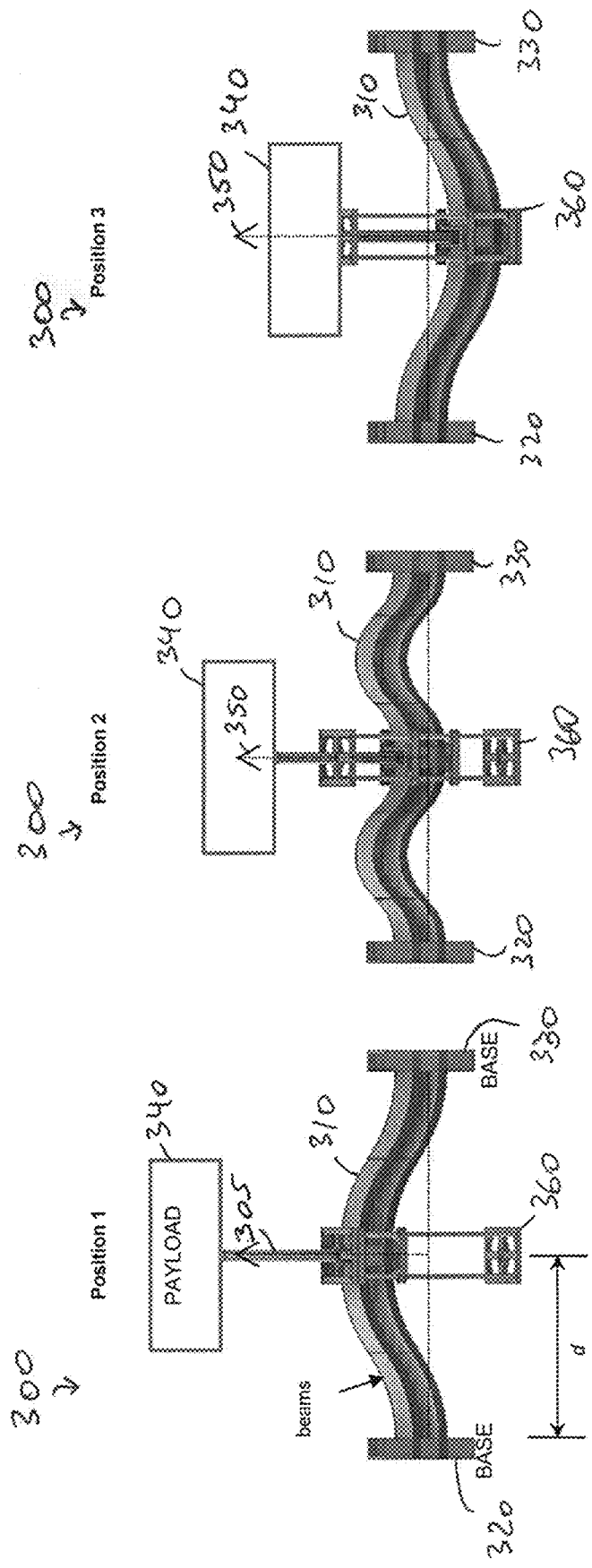

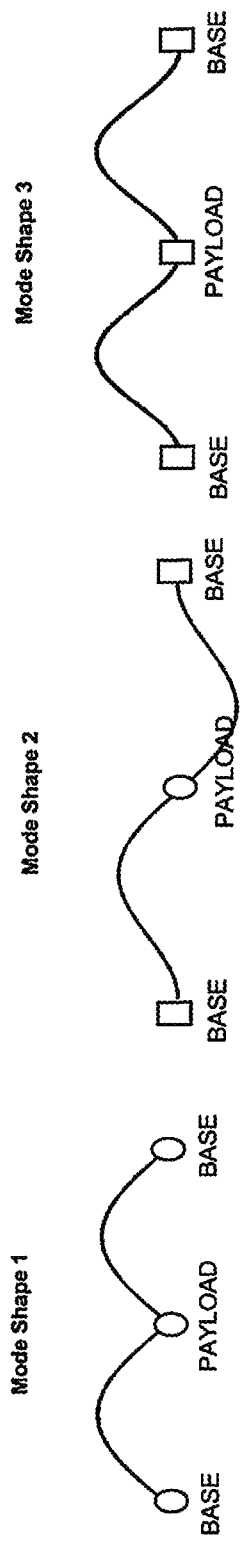

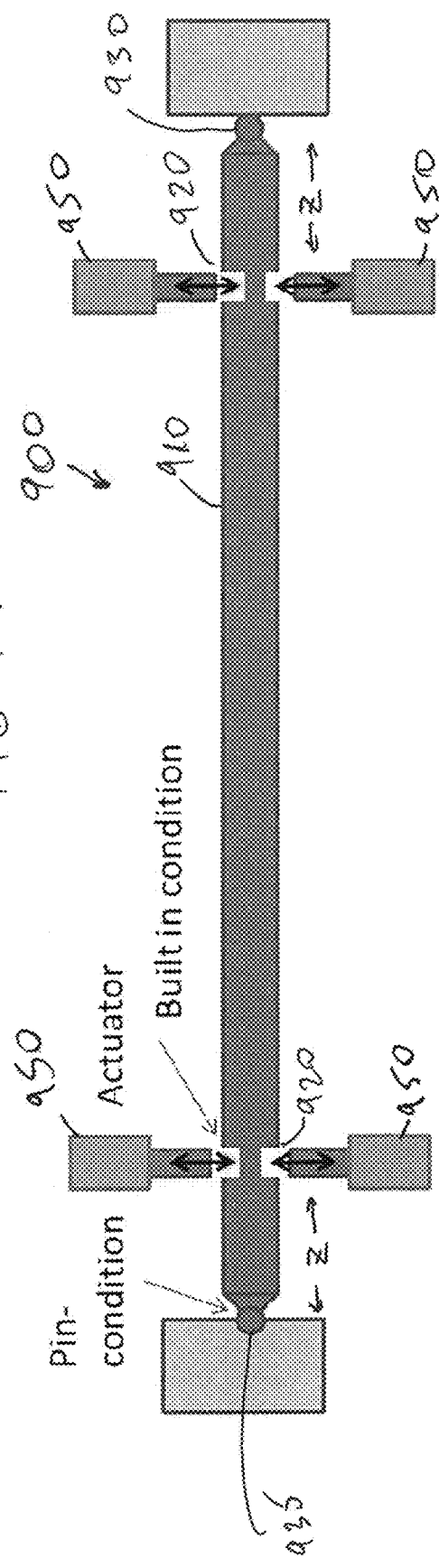
FIG. 9a
FIG. 9b
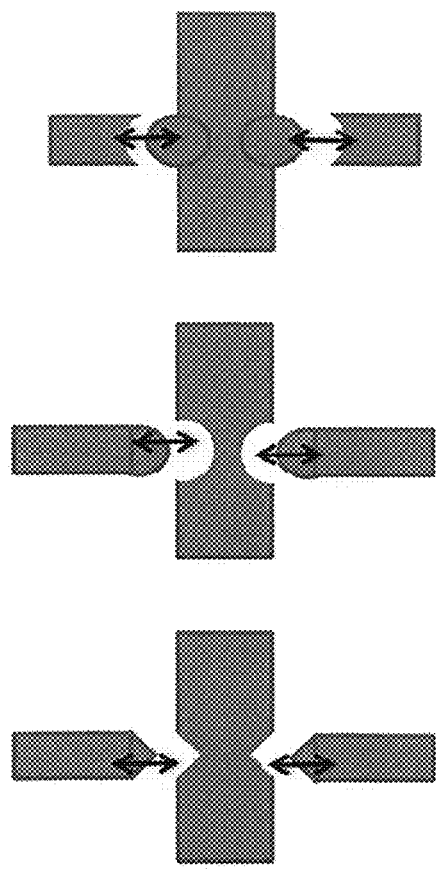
Variations on contact mechanism
FIG. 9d
FIG. 9c
FIG. 9b

US 11,473,647 B1

ISOLATION SYSTEM AND METHOD

CROSS REFERENCE TO RELATED APPLICATIONS

This application claims the benefit of U.S. Provisional Application No. 62/043,369, filed on Aug. 28, 2014, which is incorporated herein by reference in its entirety.

FIELD

The present invention relates to an isolation system and method.

BACKGROUND

In the field of low-frequency vibration and shock isolation, variable performance is typically achieved through variable damping force, forcing fluid through a variable geometry orifice or changing the viscosity of the fluid as described in, for example, U.S. Pat. No. 8,240,439 and U.S. Pat. No. 6,874,603 which are incorporated herein by reference in their entirety. These systems tend to be expensive, temperature sensitive, and offer only limited performance improvement as they dissipate energy. Fully active isolation systems, as described in, for example, U.S. Pat. No. 8,439,299 which is incorporated herein by reference in its entirety, are also know in the art. Although these systems store/release energy, they require sophisticated control algorithms and are severely limited by the power, stroke, and bandwidth of the actuator.

Passive negative stiffness isolation, known in the art, consists of a network of positive and negative stiffness springs, combined to create a nonlinear and hysteretic load path. They are capable of quasi-zero stiffness, even while supporting large loads, ultra-high stiffness, and ultra-high hysteretic (structural) damping. However, the negative stiffness isolation is for passive systems, without active tuning or adjustment of the negative side.

An active tuning of positive elements of a negative stiffness system is described in, for example, U.S. Pat. No. 8,132,773 which is incorporated herein by reference in its entirety. However, it is largely used for thermal compensation.

"Euler columns" Isolators use buckled beams as vibration isolators, however, the supported mass is in parallel with the buckled beam and this class of isolators is not adjustable as shown in FIGS. 1a-c. "Euler columns" Isolators are further described by WinterFlood et. al., Classical and Quantum Gravity, October 2002 which is incorporated herein by reference in its entirety.

In view of the above limitation, an improved isolation system and method are presently disclosed.

SUMMARY

According to one aspect, an isolation system is presently disclosed. The isolation system comprising: a buckling beam comprising a first end and a second end; and a first restraining mechanism engaged with the buckling beam, the first restraining mechanism being configured to variably control a first restraining condition of the buckling beam and to thereby affect a negative stiffness of the buckling beam.

According to another aspect, a method is presently disclosed. The method comprising: adjusting a first restraining mechanism engaged with a beam, the first restraining mechanism being configured to variably control a first restraining condition of the buckling beam and to thereby affect a negative stiffness of the buckling beam, and wherein the beam comprises a first end and a second end.

BRIEF DESCRIPTION OF THE FIGURES

FIGS. 1a-c depict Euler Column Isolator as known in the art.

FIGS. 2a-b depict an isolation system according to some embodiments of the present disclosure.

FIGS. 3a-c depict another isolation system according to some embodiments of the present disclosure.

FIGS. 5a-c depict buckled mode shapes, according to some embodiments of the present disclosure.

FIGS. 9a-d depict another isolation system according to some embodiments of the present disclosure.

Figures 4A, 4B, 4C:
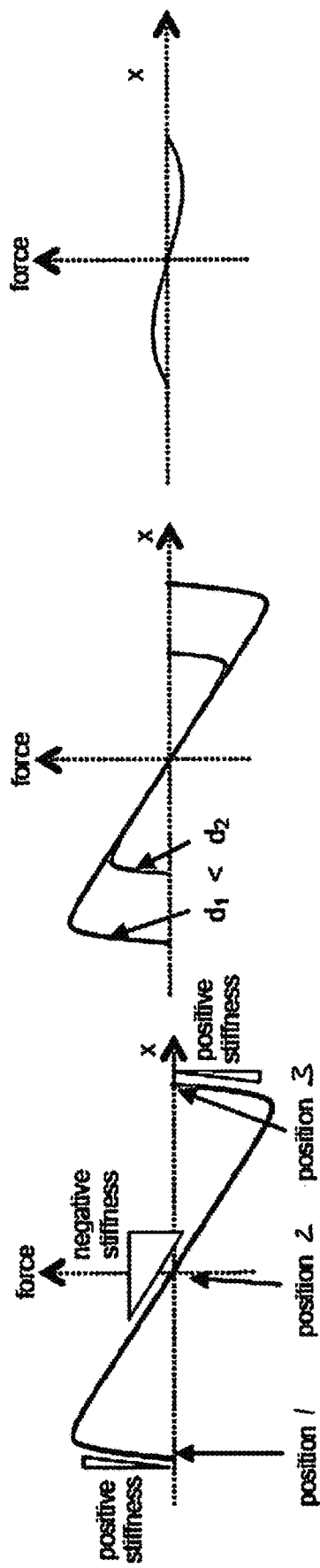
FIGS. 4a-c depict force displacement relationships generated by a negative stiffness system, according to some embodiments of the present disclosure.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

According to some embodiments, various isolation systems that are presently disclosed include a continuously variable, high throw, negative stiffness shock and/or vibration isolation system. According to some embodiments, the negative stiffness is achieved through the buckling of beams into their lowest energy buckled shape, which is controlled by, for example, changing the torsional stiffness of the beam's boundary conditions. Buckled beams provide a near constant negative stiffness over a large distance (high throw). According to some embodiments, the amount of high throw negative stiffness of the beams is continuously varied by changing the torsional stiffness at the mounting points of the beams.

According to some embodiments, various isolation systems that are presently disclosed create springs with continuously variable spring rates. Continuously variable springs have several applications including vibration isolation, sensor tuning and/or robotic joints. Systems with continuously variable spring rates allow the system to perform well over a wider range of conditions relative to systems with fixed spring rates that can behave poorly when operated away from their design condition, greatly extending the performance and functionality relative to the passive state of the art systems. According to some embodiments, various isolation systems that are presently disclosed provide stiffness changes that are continuously variable and that can be maintained at constant spring rates over a larger displacement range.

According to some embodiments, various isolation systems that are presently disclosed can be applied to, for example, transportation systems that are subject to changing payload weights and/or changing internal or external vibrations from which the payload is to be isolated. According to some embodiments, various isolation systems that are presently disclosed can be applied to, for example, car suspensions and/or engine mounts. According to some embodiments, various isolation systems that are presently disclosed can be applied to, for example, payloads subject to shocks of different energy levels such as mitigating payload damage due to drops from different heights or impacts occurring at different speeds.

Contrary to the prior art, according to some embodiments, various isolation system(s) presently disclosed provide continuously variable negative stiffness that can be maintained over large displacements.

According to some embodiments, various isolation systems that are presently disclosed include two parts: 1) a buckled beam or set of beams that produce negative stiffness over a large distance and 2) a variable torsional stiffness joint or connection between the beams and the primary structure. According to some embodiments, the joint is adjustable over a range of torsional stiffness either manually or with an actuator. According to some embodiments, the range of torsional stiffness is either continuously adjustable or have several discrete settings of torsional stiffness. According to some embodiments, isolation system presently disclosed provides continuously variable negative stiffness, efficiently over greater distances.

An isolation system 100, according to some embodiments presently disclosed, is shown in FIGS. 2a-b. According to some embodiments, the isolation system 100 comprises a negative stiffness beam 110 constrained by one or more hardening springs 120 and clamping blocks 130. According to some embodiments, a payload is placed on the clamping blocks 130 and allowed to move as shown by arrow 140. According to some embodiments, the clamping blocks 130 are coupled to ground and/or a payload by a variable compression system. The ground and/or payload may represent components to be isolated, such as a vehicle chassis and an engine, a vehicle chassis and one or more wheels, axle, or other suspension components. According to some embodiments, the variable compression system could be implemented in various ways, such as a screw-driven clamping device (not shown) or a wedge-driven clamping device (not shown). As the clamping blocks 130 are compressed further together, the spring rate of the springs increases. This results in a variable torsional stiffness end constraint for the beam 110.

According to some embodiments, the beams used by the presently disclosed isolation system(s) are buckled into a higher mode (e.g., 2, 3, or greater) in order to produce near constant negative stiffness over large displacements.

An isolation system 300, according to some embodiments presently disclosed, is shown in FIGS. 3a-c. According to some embodiments, the isolation system 300 comprises one or more beams 310 coupled at both ends of the beams 310 to bases 320, 330. Base 320 may be disposed at a first end of the beam 310, and base 330 may be disposed at a second end of the beam 310.

According to some embodiments, the center of the beams 310 is coupled to a payload 340 via a payload mount. In other embodiments, the payload mount may be part of the base 320 or the base 330.

According to some embodiments, the bases 320, 330, and the payload mount include restraining mechanisms. According to some embodiments, the bases 320, 330 and the payload 340 can move relative to each other in a constrained path such as the line represented by line 350 as illustrated by the three positions 1, 2 and 3 shown in FIGS. 3a-c. According to some embodiments, a linear bearing 360 is used to maintain the relative displacement path of the payload 340.

According to some embodiments, when the position of the center of the beams 310 is close enough to the ends of the beams 310 such that the beams 310 buckle into a higher order mode shape, negative stiffness is generated in the region indicated in the force displacement curve shown in FIG. 4a. For example, the beams 310 in positions 1 or 3 as shown FIGS. 3a and 3c are not buckled into a higher mode shape and have a positive stiffness as indicated in FIG. 4a. But when the central constraint of the beams 310 is in position 2 as shown in FIG. 3b, it is close enough to the end constraints to cause enough axial compression to buckle the beams 310 into their third mode shape and produce the negative stiffness indicated in FIG. 4a. In some embodiments, the distance over which the negative stiffness is nearly constant depends on how close the beams 310's center constraint is to the beams 310's end constraint, the distance d as shown in FIG. 3a. The shorter the distance d becomes, the longer the region of near constant negative stiffness as indicated in FIG. 4b. According to some embodiments, the shortest achievable distance d, and hence the largest achievable region of near constant negative stiffness, is determined by the maximum stress in the beams 310 and its structural limit. On the other hand, if the distance d is too high, the beams 310 may not generate enough axial compression to buckle into a higher mode shape. When this happens, negative stiffness is still generated but it is not as constant over large distances as shown in FIG. 4c.

Figure 6A:
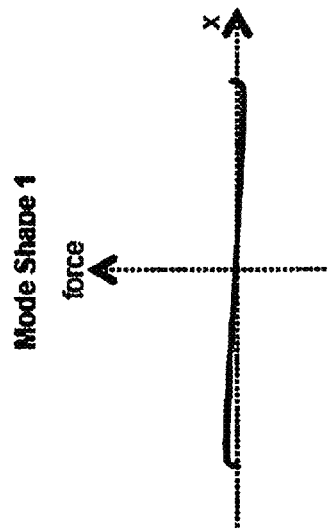
FIGS. 6a-c depict force displacement relationship generated by buckled mode shape, according to some embodiments of the present disclosure.
Figure 6B:
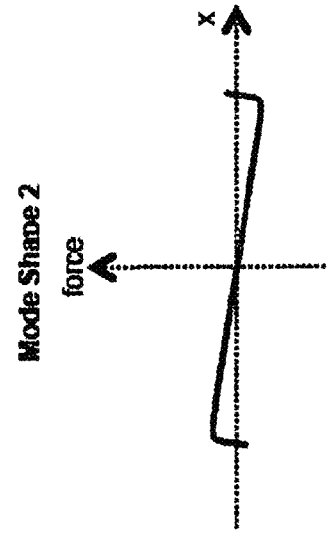
Figure 6C:
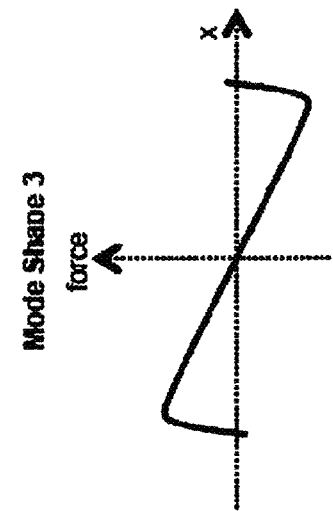

According to some embodiments, changing the torsional stiffness of the boundary conditions where the beam is connected to the base and/or to the payload changes the amount of negative stiffness. According to some embodiments, for beams with both connection points free to rotate, the beam buckles into mode shape 1 as shown in FIG. 5a. In some embodiments, for beams with one end free to rotate and the other clamped, the beam buckles into mode shape 2 as shown in FIG. 5b. According to some embodiments, for beams with both ends clamped, the beam buckles into mode shape 3 as shown in FIG. 5c. Mode shapes higher than mode 3 may be achievable by changing the boundary conditions at the connection points of the beam to the structure. The different amounts of negative stiffness that are generated by mode shapes 1, 2 and 3 are shown in FIGS. 6a-c.

Figure 7:
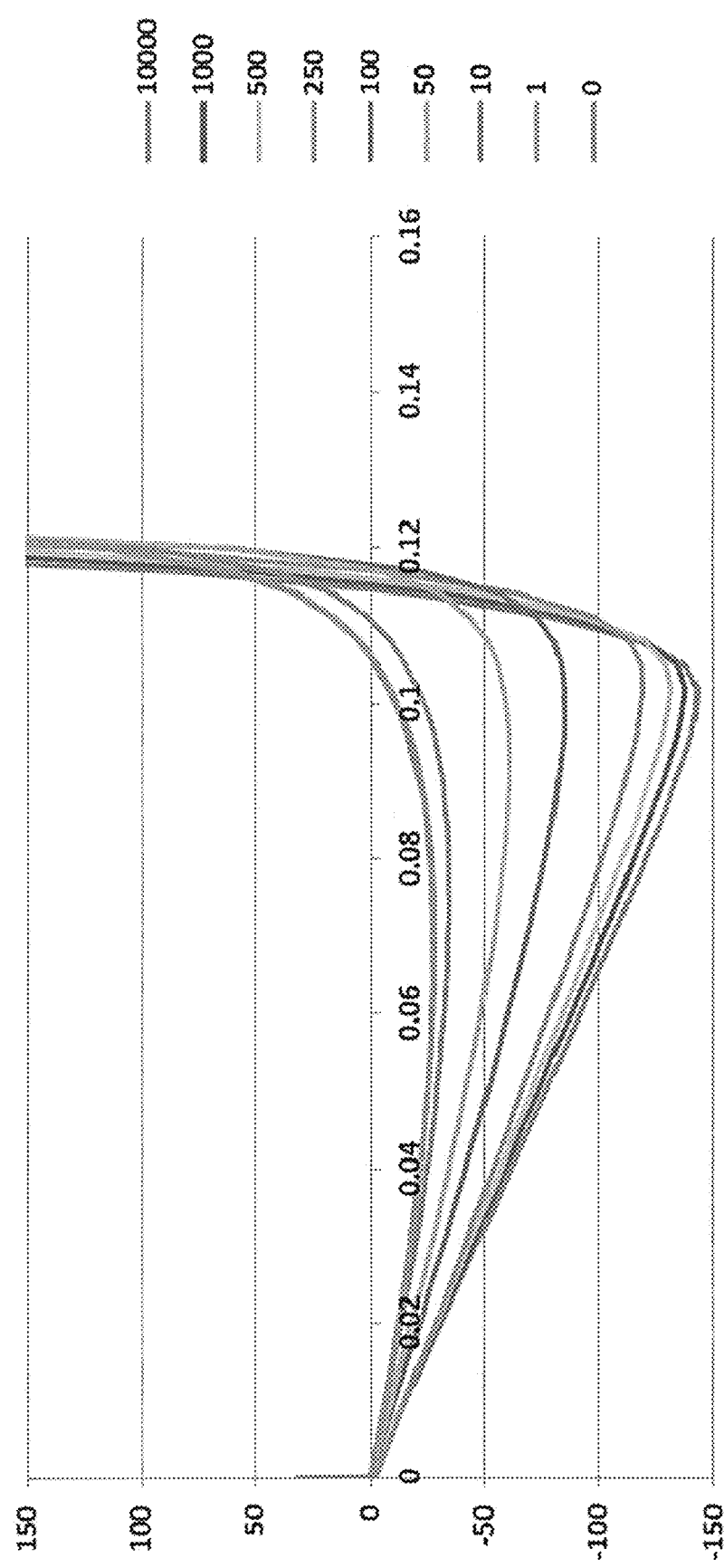
FIG. 7 depicts force displacement generated from finite element analysis by changing the torsion stiffness at the ends of the beams, according to some embodiments of the present disclosure.

According to some embodiments, changing the boundary condition at one or both of the connection points allows for transition between mode shapes and hence allows the isolation system to continuously vary the negative stiffness. For example, changing the torsional stiffness of the connection from the end of the beam to the base structure changes the negative stiffness according to a finite element analysis as shown in FIG. 7. At least some of the presently disclosed embodiments include a means (e.g., one or more restraining mechanisms) by which to vary the torsional stiffness where the beam connects to the base and/or to the payload. The torsional stiffness may be varied continuously or may be varied between different states. The restraining mechanism for varying the torsional stiffness can include, for example, hardening springs and/or compressed rubber that are clamped between two plates where the distance between the two plates is variable via an actuator such as, for example, an electric motor connected to a linear drive.

Figure 8B:
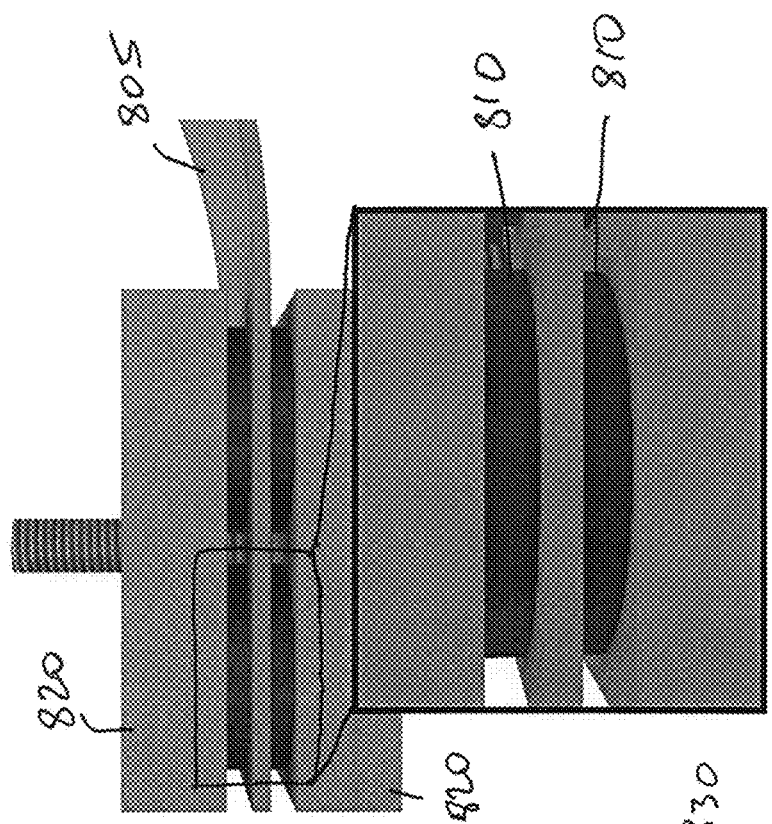
FIGS. 8a-b depict another isolation system according to some embodiments of the present disclosure.
Figure 8A:
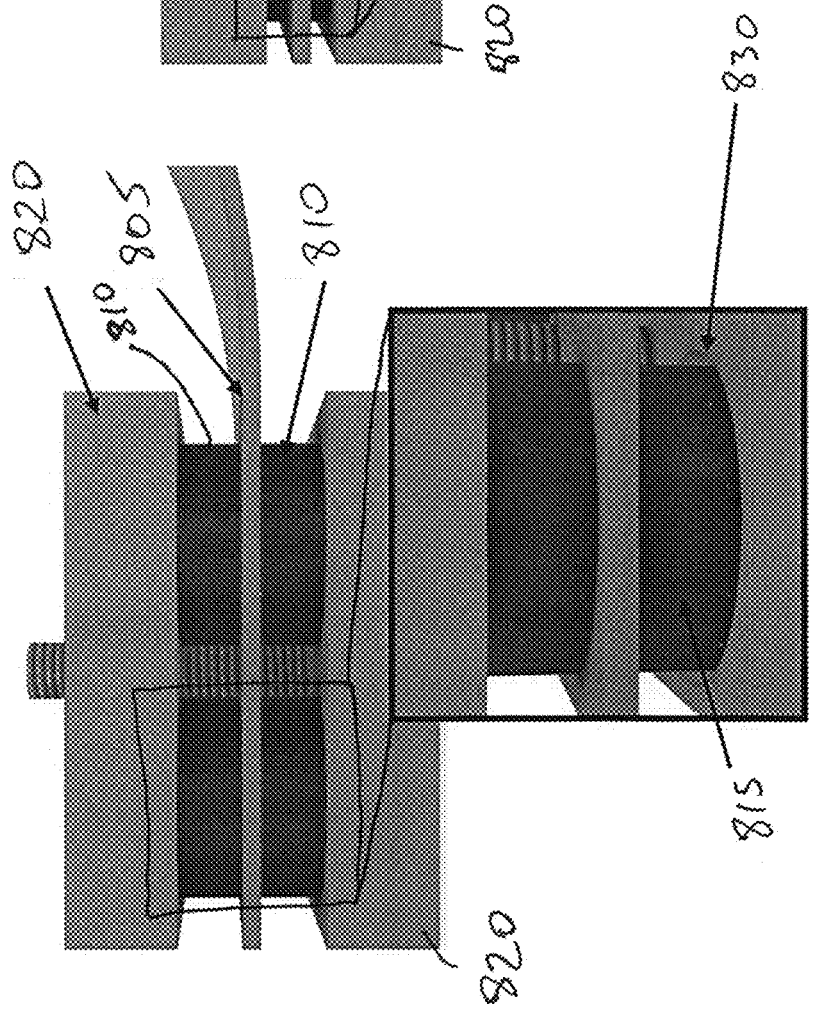
Figure 8C:
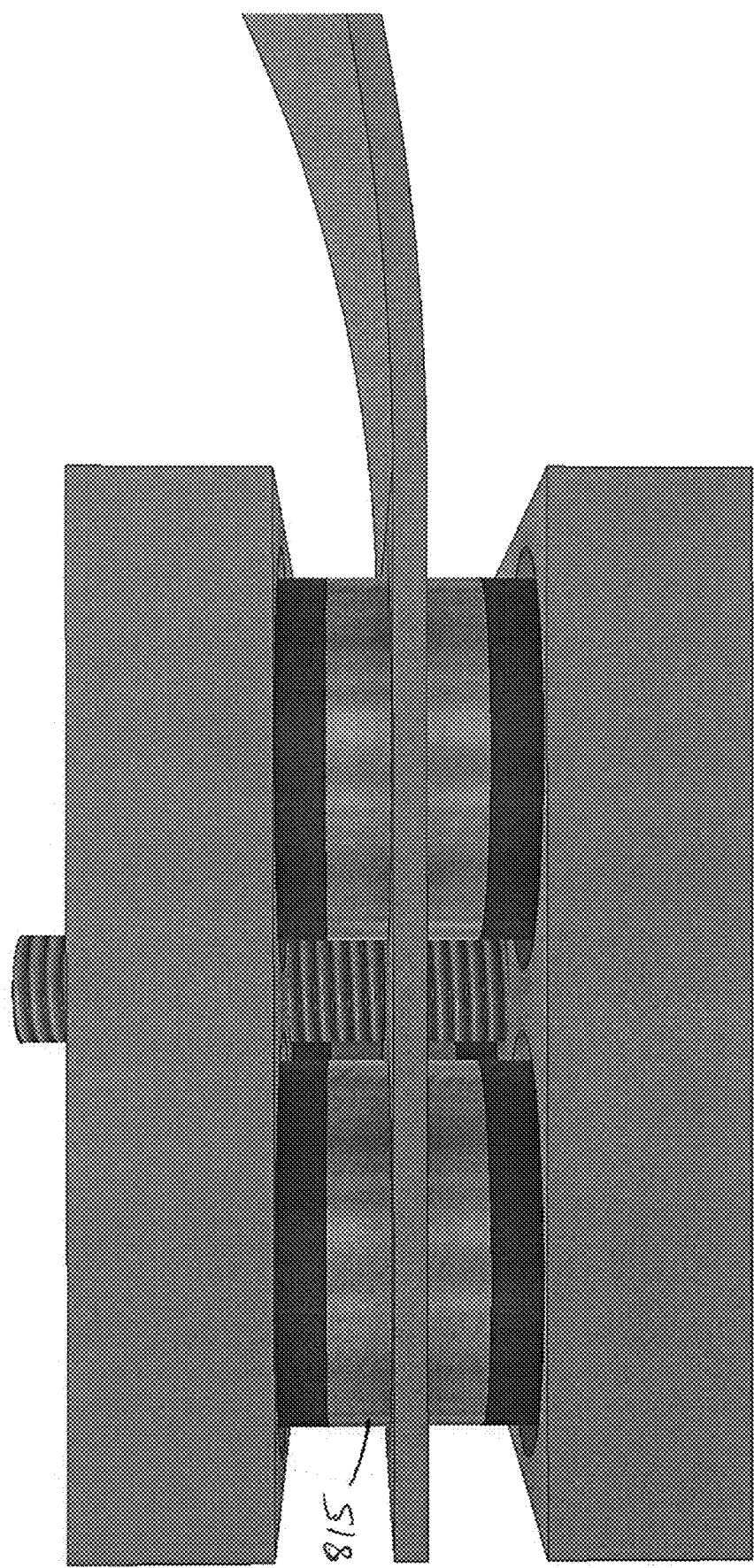
FIG. 8c depicts another isolation system according to some embodiments of the present disclosure.

According to some embodiments presently disclosed, variable torsional stiffness is based on compression stiffening of elastomers as shown in FIGS. 8a-b. The buckling beam 805 is clamped between the elastomeric material 810 that exhibits a shear hardening constitutive relationship with compression (such as, for example, urethane and/or natural rubbers). In some embodiments, spacers 815 may be added that are composed of a different material, such as, for example, metal (as shown in FIG. 8c). These spacers may not compress in the same way as the elastomeric material 810, and may therefore provide additional height while allowing for different compression displacement ranges.

According to some embodiments, the thickness of the elastomer and the number of layers (and spacers) determine the absolute stiffness, the variability of the stiffness, and the maximum angular displacement possible. According to some embodiments, when the distance between the two clamping blocks 820 is high then the torsional stiffness will be low, allowing for a larger angular displacement of the beam 805 ends as shown in FIG. 8a. According to some embodiments, when the distance between the two clamping blocks 820 is small as shown in FIG. 8b then the torsional stiffness will be high. Again, using spacers may change this relationship given that the space between the two clamping blocks 820 may be greater while using less elastomeric material to separate the clamping blocks 820.

One or both of the clamping blocks 820 may be moveable. In various embodiments, the buckling beam 805 may be clamped at one or more of the first end of the buckling beam 805, the second end of the buckling beam 805, and a midpoint between the first end and the second end.

According to some embodiments, additional hardening can be achieved by placing the elastomer in a pocket of slightly larger size than the uncompressed material 830 such that the elastomer is restricted from expanding to the side after a certain amount of compression, effectively increasing the compressive stiffness. This method for varying stiffness is described in "Handbook on Stiffness and Damping in Mechanical Design" by Eugene I. Rivin, which is incorporated herein in its entirety.

In some embodiments, the restraining mechanism may include clamps that are engaged or disengaged. Engaging the clamps may result in a fixed or held end condition, and disengaging the clamps may result in a pinned end condition as described in greater detail below.

An isolation system 900, according to some embodiments presently disclosed, is shown in FIGS. 9a-d. According to some embodiments, the isolation system 900 comprises one or more beams 910 pinned at its external points and comprising one or more clamping locations 920 a distance z away from ends 930, 935. If the distance z is relatively small compared to the length of the beams 910 the effect may be to effectively change the boundary condition without changing the length substantially. According to some embodiments, the clamping locations 920 can be engaged with a plunging clamp that will apply a fixed or built-in type boundary condition and thus prevent rotation of the beams 910. This will provide a step increase in negative stiffness for a very rigid clamping force and a variable change in negative stiffness for clamps supported by elastic elements (not shown). FIGS. 9b-d depict variations in the design including, for example, making conic or hemispherical mounting depressions in the beam, and inverting the contact pairs so a there is protrusion on the beam. According to some embodiments, the isolation system 900 comprises one or more actuators 950. The actuators 950 may be, for example, pneumatic and hydraulic, electromagnetic motors and lead screws, as well as solid state actuators, such as piezoelectric or magnetostrictive actuators. According to some embodiments, the actuator 950 selection depends on the overall stiffness of the beam 910 as well as the required travel of the beam 910 which will determine the throw of the actuator 950 and thus the particular system desired. According to some embodiments, the mechanical stiffness of the actuator 950 will affect the stiffness of the isolation system 900. For example, engaging the restraining system may include activating an actuator, which may result in the beam being held by one or more actuators.

The stiffness of the one or more actuators may affect how the isolation system 900 behaves.

Figures 10A, 10B:
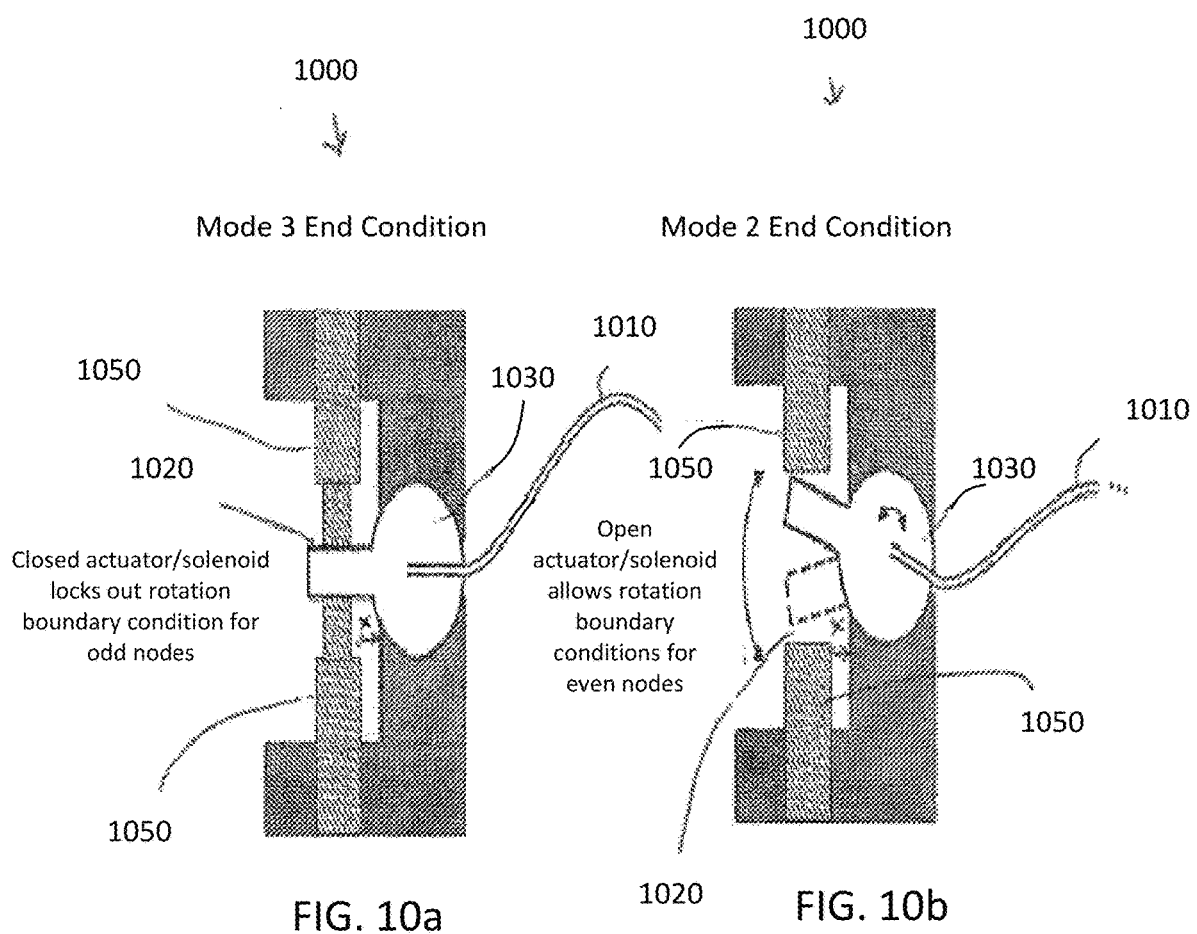
FIGS. 10a-b depict another isolation system according to some embodiments of the present disclosure.

An isolation system 1000, according to some embodiments presently disclosed, is shown in FIGS. 10a-b. According to some embodiments, the isolation system 1000 comprises one or more beams 1010 pinned at its external points and comprising one or more clamping locations 1020 a distance x away from at least one end 1030. According to this embodiment, the at least one end 1030 is positioned between the clamping locations 1020 and the beams 1010 as shown in FIGS. 10-b. According to some embodiments, the clamping locations 1020 can be engaged with a plunging clamp that will apply a fixed or built-in type boundary condition and thus prevent rotation of the beams 1010. This will provide a step increase in negative stiffness for a very rigid clamping force and a variable change in negative stiffness for clamps supported by elastic elements (not shown). According to some embodiments, the isolation system 1000 comprises one or more actuators 1050. The actuators 1050 may be, for example, pneumatic and hydraulic, electromagnetic motors and lead screws, as well as solid-state actuators such as piezoelectric or magnetostrictive actuators. According to some embodiments, the actuator 1050 selection depends on the overall stiffness of the beam 1010 as well as the required travel of the beam 1010 which will determine the throw of the actuator 1050 and thus the particular system desired. According to some embodiments, the mechanical stiffness of the actuator 1050 will affect the stiffness of the isolation system 1000.

At least some embodiments presently disclosed may be implemented if discrete values of negative stiffness are desired as opposed to continuously variable negative stiffness.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. § 112, sixth paragraph, unless the element is expressly recited using the phrase "means for . . . " and no method or process step herein is to be construed under those provisions unless the step, or steps, are expressly recited using the phrase "step(s) for. . . . "

What is claimed is:

1. An isolation system comprising:
   a buckling beam comprising a first end and a second end; and
   a first restraining mechanism comprising a first hardening spring engaged with the buckling beam at the first end;
   a second restraining mechanism comprising a second hardening spring engaged with the buckling beam at the second end,
   wherein the first restraining mechanism and the second restraining mechanism are configured to variably clamp the buckling beam to control a first and second restraining condition of the buckling beam and to thereby affect a negative stiffness of the buckling beam.

2. The isolation system of claim 1 further comprises a payload mount coupled to the buckling beam at one of the first end, the second end, and a location between the first end and the second end.

3. The isolation system of claim 1
   wherein the buckling beam is movably pinned at the first end; and
   the first restraining mechanism is engaged or disengaged to control whether the buckling beam has a pinned restraining condition or a fixed restraining condition at the first end.

4. The isolation system of claim 3, wherein the first restraining mechanism includes an actuator.

5. The isolation system of claim 3 wherein the buckling beam is movably pinned at the second end, and wherein the second restraining mechanism is engaged or disengaged to control whether the buckling beam has a pinned restraining condition or a held restraining condition at the second end.

6. The isolation system of claim 3 further comprises a payload mount coupled to the buckling beam.

7. The isolation system of claim 6, wherein the payload mount is allowed to travel between a first position and a second position.

8. The isolation system of claim 6,
   wherein the first restraining mechanism is positioned between the payload mount and the first end.

9. The isolation system of claim 6, wherein the first end is positioned between the payload mount and the first restraining mechanism.

10. An isolation system comprising:
    a buckling beam comprising a first end and a second end;
    a first restraining mechanism engaged with the buckling beam, the first restraining mechanism being configured to variably control a first restraining condition of the buckling beam and to thereby affect a negative stiffness of the buckling beam; and a base member coupled to the second end of the buckling beam,
    wherein the buckling beam is movably pinned at the first end,
    wherein the first restraining mechanism is configured to be engaged or disengaged to control whether the buckling beam has a pinned restraining condition or a fixed restraining condition at the first end, and
    wherein the first restraining mechanism includes a clamp and a hardening spring between the clamp and the first end of the buckling beam.

11. A method comprising:
    adjusting a first restraining mechanism comprising a first hardening spring engaged with a first end of a buckling beam; and
    adjusting a second restraining mechanism comprising a second hardening spring engaged with a second end of the buckling beam,
    wherein the first restraining mechanism and the second restraining mechanism are configured to variably clamp the buckling beam to control a first restraining condition and a second restraining condition of the buckling beam and to thereby affect a negative stiffness of the buckling beam.

12. The method of claim 11, wherein adjusting the first restraining mechanism comprises:
    engaging or disengaging the first restraining mechanism to control whether the buckling beam has a pinned restraining condition or a held restraining condition at the first end.

13. A method comprising:
    adjusting a first restraining mechanism engaged with a buckling beam, the first restraining mechanism being configured to variably clamp the buckling beam to control a first restraining condition of the buckling beam and to thereby affect a negative stiffness of the buckling beam,
    wherein the beam comprises a first end and a second end,
    wherein adjusting the first restraining mechanism comprises:
       moving at least one moveable clamping block comprising a first elastomeric material,
    wherein the first end is coupled with the first elastomeric material by the at least one clamping block, and
    wherein a negative stiffness of the buckling beam is varied based on compression stiffening changes of the first elastomeric material caused by position changes of the at least one moveable clamping block.

* * * * *